United States Patent [11] 3,562,519

[72] Inventors Myron N. Palmer
Gibsonia;
Thomas J. Puzniak, Cheswick, Pa.
[21] Appl. No. 769,295
[22] Filed Oct. 21, 1968
[45] Patented Feb. 9, 1971
[73] Assignee Gulf Research & Development Company
Pittsburgh, Pa.
a corporation of Delaware

[54] CONSTANT MASS SAMPLE CELL
15 Claims, 1 Drawing Fig.
[52] U.S. Cl. .................................................. 250/43;
137/403, 137/414; 250/43.5
[51] Int. Cl. ...................................................... G01n 21/26
[50] Field of Search ............................................ 250/43.5R,
43.5FC, 43.5FL, 43.5D, 43.5, 43; 137/403, 414

[56] References Cited
UNITED STATES PATENTS
| | | | |
|---|---|---|---|
| 2,791,698 | 5/1957 | Dyroff et al. .................. | 250/43.5 |
| 3,411,529 | 11/1968 | Bassett ......................... | 137/403 |
| 3,426,788 | 2/1969 | Bassett ......................... | 137/403X |

*Primary Examiner*—James W. Lawrence
*Assistant Examiner*—Davis L. Willis
*Attorneys*—Meyer Neishloss, Deane E. Keith and William Kovensky

ABSTRACT: Means providing a sample cell for use in other analyzers requiring a constant mass of liquid sample. The invention utilizes the principle that weight is proportional to mass, and adjusts the height of the liquid in the constant-cross-section cell inversely in response to density changes.

PATENTED FEB 9 1971
3,562,519
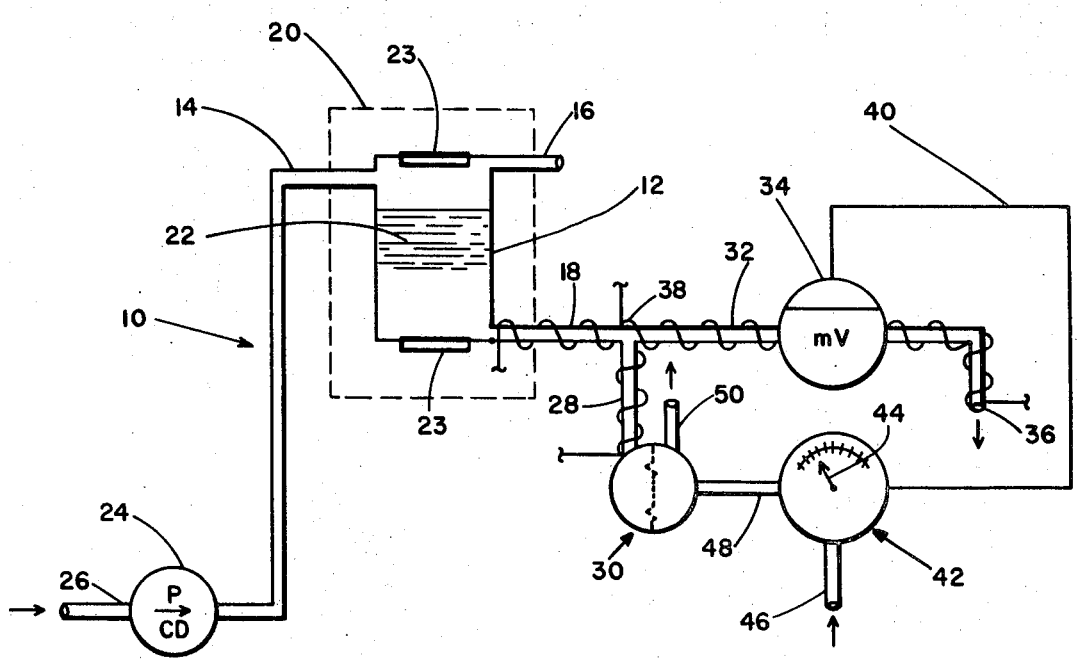
INVENTORS
MYRON N. PALMER
THOMAS J. PUZNIAK

CONSTANT MASS SAMPLE CELL

This invention pertains to the field of measuring instruments, and more particularly the invention provides methods and apparatus to provide a cell for containing a sample of a liquid to be analyzed for any of certain specific chemical or physical characteristics dependent on mass. For example, many instrumental techniques require corrections to insure that the resultant measurements are uneffected by changes in the density of the sample. This consideration is particularly important in continuous measurement techniques, i.e., those in which the sample continuously flows through the measuring instrument. The density correction is particularly important in instrumentation techniques utilizing nuclear absorption, for measuring sulfur or lead content in hydrocarbon streams, for example, or when using ultraviolet light for color analysis, or aromatics content analysis and the like in hydrocarbon streams.

Most prior techniques include making a separate density measurement of the sample, and utilizing the density data in the subsequent analysis or in the numerical handling of the data resulting from the subsequent analysis to compensate for changes in density. Such prior techniques introduce another source of error in the taking of the density measurement, and still another source of error in the handling of the density data.

In the present invention no separate density measurements are required, and the mass content of the sample cell is automatically and continuously held constant. Thus, the sources of error resulting from separate density measurements are eliminated. The basic concept of operation of the present invention is that weight is directly proportional to mass and that pressure times height in a uniform cross section container is directly proportional to weight. Means are provided to measure the pressure in the sample cell, and by varying the height of the liquid in the sample cell inversely in response to changes in pressure, mass is automatically kept constant.

The above and other advantages of the invention will be pointed out or will become evident in the following detailed description and claims, and in the accompanying drawing also forming a part of the disclosure, in which the sole figure is a schematic elevational view of the apparatus of the invention.

Referring now in detail to the drawing, 10 designates a constant mass sample cell embodying the invention. Apparatus 10 comprises a sample container 12 having a sample inlet conduit 14, an air vent conduit 16 and a sample outlet conduit 18. The dotted line rectangle 20 surrounding container 12 is indicative of the fact that the container 12 is advantageously embodied in some other instrument which is operating on the liquid sample 22 in the container to analyze some characteristic of the sample. Each end of container 12 comprises a window 23 which is formed of a material which is transparent to the particular energy being used in the analysis. For example, when the analysis is by ultraviolet or infrared light, then windows 23 would be of quartz or the like material. When any sort of nuclear analysis is being performed, then windows 23 would be of beryllium or the like "transparent" material.

Conduit 14 is connected to the output side of any suitable type of positive displacement pump 24. A conduit 26 connects the input side of pump 24 to some source of the liquid to be analyzed, such as a large pipe in a refinery process. It is important that pump 24 be of the positive displacement type to supply a constant volume of sample per unit time, for a reason that will appear more clearly below.

Outlet conduit 18 comprises a first branch conduit 28 which is connected to one side of a differential pressure cell and transmitter 30. The parts are so connected together that the vertical distance between pressure cell 30 and container 12 is rigidly held, which is easily accomplished by fixing the parts to a sturdy stand or a cabinet in any suitable manner. Outlet conduit 18 comprises a second branch conduit 32 which passes through a motor control valve 34 and terminates at a location indicated by 36 below the bottom of container 12. Upon exiting from the end 36, sample material may be discarded, or collected and reused, as desired.

Means are provided to eliminate the effect of both temperature changes and viscosity changes in the sample handling portions of the apparatus of the invention. To this end, conduits 18, 28 and 32 are provided with heating means 38, which may simply comprise electrical heating wires wrapped around the conduits to maintain a sufficiently high constant temperature to eliminate the effect of temperature and viscosity perturbations. As thus far described, the operation of the apparatus under constant or unchanging density conditions, is as follows. Pump 24 supplies a constant volume of sample per unit time. Valve 34 is so adjusted that the same quantity per unit time is allowed to leave the system out of end 36. So long as density does not change, the constant volume of liquid sample in container 12 will also be a constant mass, However, density perturbations are normally experienced, and it is compensation of these density perturbations which is the primary task of the apparatus of the invention.

Motor valve 34 is operated by signals in a control line 40. Control line 40 is representative only, in that it may represent an electric signal, a hydraulic signal, a pneumatic signal, or the like, so long as it is consistent with the other components of the control apparatus used, described below. The control signals in line 40 are supplied by a servocontroller 42 having a set point controller 44 therein. In the successfully constructed embodiment of the apparatus of the invention, a pneumatic media was utilized, and use with pneumatic controls will be described hereinafter, but this is to be considered illustrative only, and not in a limiting sense. Control air pressure is delivered to servocontroller 42 via line 46. A pneumatic control line 48 interconnects servocontroller 42 with the second side of differential pressure cell and transmitter 30. A pneumatic control air vent line 50 extends from said second side of said differential pressure cell and transmitter 30. The location of vent line 50 is diagrammatic only, in that, depending upon the nature of the particular components used, venting could be accomplished at one or both of the cell 30 and/or the servocontroller 42.

Thus, in operation, upon experiencing a density perturbation after normal operation has been established, the left side of cell 30 will experience a change in pressure in that the head of liquid in container 12 is still the same but the density of the liquid has changed. This change in head is transmitted through the cell, through line 48, and to servocontroller 42, which compares this new condition with the previously set normal or nominal condition, as set on set point controller 44. An error signal is transmitted through line 40 to motor valve 34 which causes the valve to change the rate of flow of sample out of the system. For example, if the density perturbation were to be an increase in density, then the valve would be opened slightly to allow the sample by flow out of the system faster than it is being supplied into the system to pump 34. As the height of liquid in the container 12 fell to the point at which the head it generates would be equal to the pressure on the right side of the cell 30, the mass of sample in the cell would decrease to the normal or nominal mass desired in sample cell 12. As the equilibrium condition is approached, servocontroller 42 simultaneously readjusts valve 34 so that the amount of liquid leaving the system again equals the amount of liquid entering the system. In the event the density perturbation were to be a decrease in density then the above steps would take place in reverse. It will also be understood that the above changes, corrections, and error signals are generated and supplied and motor valve 34 is operated in a continuous and a proportional manner rather than in steps. It will also be appreciated that since the liquid system is vented at both ends, i.e., vent 16 in the container 12 and open end 36, the effect of changes in atmospheric pressure are canceled.

In starting up, container 12 is filled with a material or with some of the liquid to be analyzed to an arbitrary height substantially less than full, for example, container 12 may be filled to about two-thirds of its height. The mass and the density of this first sample for startup purposes should be known and be reasonably close to the same characteristics of the liquid to be analyzed This height of liquid in container 12 will produce a certain pressure in lines 18 and 28 and on the left side of cell 30. Set point controller 44 on servocontroller 42 will be moved to supply a pressure through line 48 to just balance this head on the right side of cell 30. Then valve 34 is manually moved to the known location at which the flow therethrough will just equal the flow supplied from pump 34. Thereafter, the apparatus will operate as described below, automatically and continuously to always maintain this same nominal and constant mass of liquid in container 12. It is noteworthy that density is at no time measured in the method and apparatus of the invention Changes in mass are directly compensated for without going through the intermediate steps of measuring and compensating for density changes.

It will also be clear to those skilled in the art that the invention could be used to accommodate changes in other sample characteristics, such as temperature, or the like, effecting mass.

In the successfully constructed embodiment of the apparatus of the invention utilized for analysis of hydrocarbon streams by nuclear absorption techniques, sample cell 12 comprises a cylinder container formed of stainless steel and having a total capacity of about 30 cc. Pump 24 was of the rotary gear type, and had a capacity of 100 cc. per minute. Differential pressure cell and transmitter 30 was manufactured by the Foxboro Company their Model No. 15A. Servocontroller with integral set point controller 42—44 is known as a Moore Nullmatic Controller, Model No. 561M. Motor valve 34 is manufactured by Precision Products and Controls, Inc. their Model No. 78S Research Control Valve.

While the invention has been described in detail above, it is to be understood that this detailed description is by way of example only, and the protection granted is to be limited only within the spirit of the invention and the scope of the following claims.

We claim:

1. A method of maintaining a desired constant mass of a sample liquid which experiences density perturbations in a sample cell comprising the steps of continuously supplying a constant volume of said liquid to said cell per unit time, normally holding the flow of said liquid out of said cell equal to the flow of said liquid into said cell, generating a reference pressure proportional to said desired constant mass of sample liquid, continuously detecting the pressure of said liquid in said cell, continuously comparing said reference pressure to said detected pressure, and utilizing pressure differences found in said step of comparing pressures resulting from said liquid experiencing a density perturbation to change the flow of said liquid out of said cell so as to maintain said desired constant mass of sample liquid in said cell.

2. The method of claim 1, wherein said changes in the pressure of the liquid in the sample cell with respect to the reference pressure are utilized to generate a control signal, and wherein said control signal is utilized to control the rate of flow of sample out of the sample cell.

3. The method of claim 2, wherein the flow out of the sample cell is controlled by a valve, and said control signal operates said valve continuously and in proportion to changes in said control signal.

4. The method of claim 1, and maintaining the sample at a constant temperature.

5. The method of claim 1, and further comprising the steps of venting the sample cell above the liquid therein to atmosphere, and venting the location of exit of the sample out of the sample cell after the location of control of the rate of flow to atmosphere.

6. Apparatus for maintaining a desired constant mass of a liquid which experiences density perturbations, comprising a sample cell for containing a sample of the liquid, pump means for continuously supplying sample liquid to said sample cell at a constant volume per unit time, conduit means for flowing sample liquid out of the sample cell, flow control means in said conduit means for normally holding the flow of sample liquid out of said sample cell equal to said constant flow of said sample liquid into said sample cell, means for generating a reference pressure proportional to said desired constant mass of sample liquid, means for detecting the pressure of said sample liquid in said sample cell, means for comparing said reference pressure to said detected pressure, means for generating a control signal when said detected pressure is different from said reference pressure as when said sample liquid experiences a density perturbation, and means for causing said control signal to operate said flow control means in said conduit means, whereby the rate of flow of said sample liquid out of said sample cell is controlled and said desired constant mass of sample liquid is maintained in said sample cell.

7. The combination of claim 6, wherein said means for detecting the pressure generated by the liquid in the sample cell and said means for comparing the reference pressure to said detected pressure comprises a differential pressure cell and transmitter.

8. The combination of claim 6, wherein said means for generating a reference pressure and said means for generating a control signal when the detected pressure is different from said reference pressure comprises a servocontroller including a set point control.

9. The combination of claim 8, said flow control means comprising a motor valve, and said means for causing said control signal to operate said motor valve comprising signal transmission means interconnecting said servocontroller and the motor portion of said motor valve.

10. The combination of claim 6, means for venting said sample cell above the liquid therein to atmosphere, and means for venting said conduit means downstream of said flow control means to atmosphere.

11. The combination of claim 6, said pump means for continuously supplying sample liquid comprising a gear pump.

12. The combination of claim 6, and heating means for maintaining said conduit means at a constant temperature.

13. Apparatus for providing a constant mass of a liquid, comprising a sample cell adapted to contain a sample of the liquid, pump means to continuously supply sample liquid to said sample cell at a constant volume per unit time, conduit means to permit the flow of sample liquid out of the sample cell, flow control means in said conduit means, means to generate a reference pressure, means to detect the pressure generated by the height of liquid in the sample cell, means to compare said reference pressure to the detected pressure of the height of liquid in the sample cell, means to generate a control signal when the pressure of the height of the liquid in the sample cell is different from said reference pressure, and means to cause said control signal to operate said flow control means in said conduit means, wherein said sample cell is incorporated into an analyzer for analyzing the sample liquid in the sample cell for a characteristic of said liquid, and wherein said analyzer utilizes energy passed through the liquid sample for said analysis, said sample cell being formed with a window at each of its upper and lower ends, and said window consisting of a material which freely passes the energy used for said analysis.

14. The combination of claim 13, wherein said analysis is formed by a nuclear absorption technique, and wherein said windows consist of Beryllium.

15. The combination of claim 13, wherein said energy consists of light energy, and wherein said windows consist of quartz.